United States Patent [19]

Clavenna et al.

[11] Patent Number: 5,421,841

[45] Date of Patent: Jun. 6, 1995

[54] PROCESS FOR THE ELIMINATION OF SILICA AND OTHER IMPURITIES IN FLUIDIZED BED SYN GAS PRODUCTION

[75] Inventors: LeRoy R. Clavenna; Nikos J. Maris; Mark L. Tiller; James H. Taylor; Geoffrey R. Say, all of Baton Rouge, La.

[73] Assignee: Exxon Research and Engineering Company, Florham Park, N.J.

[21] Appl. No.: 301,207

[22] Filed: Sep. 6, 1994

[51] Int. Cl.⁶ .................................................. C01B 3/44
[52] U.S. Cl. ................................ 48/198.6; 48/197 R; 48/198.7; 252/373
[58] Field of Search ............... 48/198.5, 198.6, 198.7, 48/198.8, 214 A, 215, 197 R, 198.1; 252/373; 423/651, 652, 653, 654, 418.2

[56] References Cited

U.S. PATENT DOCUMENTS

| | | | |
|---|---|---|---|
| 2,482,866 | 9/1949 | Phinney | 48/198.7 |
| 4,525,176 | 6/1985 | Koig et al. | 48/197 R |
| 4,726,913 | 2/1988 | Brophy et al. | 252/373 |
| 4,877,550 | 10/1989 | Goetsch et al. | 252/373 |
| 5,143,647 | 9/1992 | Say et al. | 252/373 |
| 5,348,717 | 9/1994 | Clavenna et al. | 423/418.2 |

*Primary Examiner*—Peter Kratz
*Attorney, Agent, or Firm*—Llewellyn A. Proctor; Jay Simon

[57] ABSTRACT

A process for the production of syn gas (hydrogen and carbon monoxide) by reaction at high temperature between low molecular weight hydrocarbons, steam and oxygen in an impurities-containing refractory lined reaction zone. The lined reaction zone is pretreated with steam, or with steam and a reducing gas, e.g. a mixture of steam and hydrogen to leach out, react with, and transport the impurities, i.e., the reaction products of silica, or silica plus phosphorus or sulfur, or silica plus phosphorus and sulfur, from the reaction zone. Steam alone may be used to leach out, convert the silica to gaseous silicic acid, and remove same from the reaction zone; and then the hydrocarbons, steam and oxygen feeds are introduced into the reaction zone to produce syn gas.

12 Claims, No Drawings

PROCESS FOR THE ELIMINATION OF SILICA AND OTHER IMPURITIES IN FLUIDIZED BED SYN GAS PRODUCTION

FIELD OF THE INVENTION

This invention relates to improvements in a process for the production of syn gas by reaction between low molecular weight hydrocarbons, steam and oxygen enclosed within a lined impurities-containing reaction zone. Steam, preferably a mixture of steam and a reducing gas, e.g. hydrogen, at high temperature, is introduced into the reaction zone to pretreat the liner, and the pretreatment continued to leach out, react with, and remove the impurities (silica, phosphorus, and sulfur) from the reaction zone, and in a subsequent step the hydrocarbon feed, steam and oxygen are reacted in the reaction zone to produce syn gas.

BACKGROUND

Fluid bed processes have been employed for many years, and provide superior heat and mass transfer characteristics. For example, in an FBSG process it is known to produce synthesis gas (hydrogen and carbon monoxide) from low molecular weight hydrocarbons, primarily methane, reacted in the presence of steam, or both steam and oxygen at high temperature in a fluidized bed of catalyst, e.g. nickel-on-alumina, or admixture of catalyst and a solids diluent to moderate and control the heat of reaction.

In conducting such processes, reaction temperatures generally range about 1500° F. to about 1900° F. and higher, typically from about 1700° F. to about 1800° F.

The reactors thus operate at temperatures well above about 1000° F., a temperature at which ordinary steel becomes structurally weak, and mechanically unsound; and the difficulties of such operations are increased as temperatures are increased above about 1000° F.

Protection of the outer shell of the reactor from contact with gases at these high temperatures is essential, and it is required that the inside face, or internal side of the shell enclosing the intensely hot reaction zone be lined with a thermally insulating material, or refractory. A commonly used refractory material is, e.g., firebrick constituted of silica and alumina plus impurities. Often, for very high reaction temperatures the silica content or the alumina content is increased, one component relative to the other; forming a silica brick or an alumina brick (sillimanite, mullite, or fused corundum). Commonly used construction materials or liners of mechanical strength, thickness, and insulation quality sufficient for lining the internal walls of reactors to withstand these high temperatures, it has been found, thus all too often contain impurities; compounds many of which interfere with the normal operation of the process and decrease process efficiency. Silica, $SiO_2$, is for example a contaminating compound which even in small concentration is leached from the liner by the steam to severely deactivate the catalyst, and cause serious catalyst agglomeration. Other impurities often found in such refractory materials and liners are, e.g., phosphorous and sulfur; both like silica known catalyst poisons which are leached from the liner to contaminate the catalyst.

THE INVENTION

The present invention relates to improvements in a process for forming a syn gas, or reaction product mixture of hydrogen and carbon monoxide, from low molecular weight hydrocarbons by contact in a reaction zone, or chamber formed within an impurities-containing refractory liner supported upon and covering the inside wall of the reactor, with a fluidized solids bed of a catalytic metal-on-alumina catalyst, or mixture of catalyst and a solids diluent, at high temperature in the presence of steam or both steam and oxygen. In accordance therewith, in an initial step prior to charging catalyst into the reaction zone, steam at high temperature is injected into the reaction zone to contact the inside face of said liner and react with the impurities component, or components thereof to leach out, react with, and remove same from the reaction zone; and then, in a subsequent step, or steps, introduce the low molecular weight hydrocarbons and steam, or hydrocarbons with both steam and oxygen, into the reaction zone into contact with a fluidized solids bed of the catalyst, or mixture of catalyst and solids diluent, to form syn gas.

The liner is contaminated with any of silica, phosphorus or sulfur as impurities; generally with silica plus phosphorus or sulfur, or with silica plus both phosphorus and sulfur. On contacting a silica-contaminated liner with steam at high temperature, and continuing the contact for a sufficient period, the silica will leach out of, migrate from the liner wall, and react with the steam to form a volatile species such as ortho silicic acid, $Si(OH)_4$. Generally after several days of such treatment a sufficient amount of the silica will have migrated from the wall, and been removed, that the catalytic metal-on-alumina catalyst, e.g., a nickel-on-alumina catalyst, will be virtually unaffected on initiation of the syn gas reaction. By contacting a liner contaminated with silica, phosphorus and sulfur at high temperature for a sufficient period with steam in a reducing atmosphere, suitably with a mixture of steam and hydrogen, not only will the silica be removed, but additionally the phosphorus and sulfur will leach out, react and be removed from the reaction zone such that on start up of the reactor to produce syn gas there will be no adverse effect on the catalyst produced by the silica, or the phosphorus, or the sulfur impurities. In its preferred embodiment therefore, the impurities-containing liner is contacted and treated at high temperature for a sufficient period with steam in a reducing atmosphere, suitably with a mixture of steam and hydrogen, to effectively remove not only the silica, but also any phosphorus or sulfur contaminants that may be present in the liner.

The improved process combination thus includes a pretreatment step with steam, and preferably with steam and a reducing gas containing one or more of hydrogen, carbon monoxide and methane, or more preferably with a mixture of steam and hydrogen, for start up of a reactor, the reaction zone of which is insulated with a refractory liner containing a silica impurity. The contact of the silica-containing refractory liner with the steam, or mixture of steam and reducing gas is continued at temperature ranging from about 1500° F. to about 1900° F., and higher, preferably at temperature ranging from about 1700° F. to about 1800° F., to produce migration via steam transport of the silica from within the liner, and discharge of the silica as gaseous silicic acid from the reactor; this generally requiring a period of steaming ranging from about 1 day to about 60 days, or most often from about 5 days to about 15 days, at steam (water) partial pressures ranging from about 30 pounds per square inch absolute (psia) to about 400 psia, preferably from about 60 psia to about 200 psia. In conducting the process, the bed solids diluent, if a bed solids diluent is to be used, is preferably added to the reaction zone prior to the steam pretreatment step and fluidized for more uniform heat transfer, and the heat for the pretreat is achieved by partially burning natural gas with air, or oxygen, in the presence of the steam. On cessation of the silica migration from the liner, or silica and other impurities, due to diffusion limitations within the pore structure of the refractory liner, the catalyst is then added to the reaction zone, the reaction zone is brought to temperature, and the production of syn gas is then begun.

In conducting this process, the pretreatment with the admixture of steam and reducing gas, e.g. hydrogen, is preferred since such treatment will eliminate as a source of contamination not only silica but as well any phosphorus, or sulfur, or both phosphorus and sulfur, which may be contained with the silica as impurities within the liner. In the admixture of steam and hydrogen, these components are provided in molar ratio of steam:reducing gas, or steam:hydrogen, ranging from about 10:1 to about 0.1:1, preferably from about 4:1 to about 25:1.

After removal of the impurities the low molecular weight hydrocarbons, e.g. $C_1$-$C_4$ alkanes, predominantly methane, steam and oxygen are introduced into the reaction zone and contacted with a fluidized bed of catalyst solids, or a fluidized bed of catalyst solids admixed with a heat transfer solid; the average particle diameter of both the heat transfer component and the catalyst of which ranges from about 30 microns to about 150 microns, preferably from about 60 microns to about 90 microns. The catalyst is constituted of a support, or carrier, notably a refractory inorganic oxide, particularly alumina, with which is composited a metal, or metals, e.g., nickel, platinum, ruthenium or the like, catalytic for the production of hydrogen and carbon monoxide from low molecular weight hydrocarbons contacted with a fluidized bed of the catalyst at high temperature hydrothermal conditions. Suitably the catalyst is a nickel-on-alumina catalyst, and preferably a nickel-on-alpha alumina catalyst, of particle size distribution corresponding to that of the heat transfer component. An admixture constituted of from about 10 percent to about 99.9 percent of said particulate heat transfer solid, preferably from about 80 percent to about 99.5 percent, and from about 0.1 percent to about 90 percent, preferably from about 0.5 percent to about 20 percent, of the catalyst, based on the total weight of the admixture (dry basis), can be fluidized at temperatures ranging from about 1500° F. to about 1900° F., preferably at temperatures ranging between about 1600° F. to about 1800° F.

A nickel-on-alumina catalyst is preferred. The catalyst contains preferably from about 1 percent to about 20 percent nickel, more preferably from about 5 percent to about 10 percent nickel, composited with an alumina support, preferably an alpha alumina support.

This invention will be more fully understood by reference to the following non-limiting examples which illustrate its more salient features. All parts are in terms of weight, and temperatures are in terms of Fahrenheit degrees except as may otherwise be specified.

In a first example, a mixture of steam and hydrogen is used to leach out, react with, and remove silica from a silica-containing refractory, as used for lining an FBSG reactor.

EXAMPLE 1

In a study of silica transport from a silica-containing refractory, 20.4 gram specimens of a Resco 17EC refractory, containing 35.2 wt. % silica, (0.026 wt. % phosphorus and 0.013 wt. % sulfur), were contacted with mixtures of steam and hydrogen in molar ratio steam:hydrogen of 10:1 at 1750° F. and 11.5 psia over consecutive balance periods of 1, 2, 4, 8, 8, and 8 days. Downstream of the refractory samples high purity alumina was used to collect the silica lost from the refractory specimens. Silica transported from the refractory was determined by weight loss of the refractory samples and by analysis of the silica collected on the downstream alumina. Reference is made to Table 1 which shows a comparison between the silica weight loss and the silica collected for each of the balance periods. The total time on stream was 31 days.

TABLE I

SILICA LOSS FROM REFRACTORY
IN LAB STEAMING EXPERIMENT
Refractory: Resco 17EC
Sample Weight = 20.4 g; 1750° F., 115 psia;
Feed Molar $H_2O/H_2$ = 10/1
Sample Area, 55.70 cm$^2$

| Balance # | 1 | 2 | 3 | 4 | 5 | 6 |
|---|---|---|---|---|---|---|
| "Time on Balance, days" | 1.1 | 2.0 | 4.0 | 8.0 | 8.0 | 8.0 |
| "Time on Stream, days" | 1.1 | 3.1 | 7.1 | 15.1 | 23.1 | 31.1 |
| "$H_2O$ Feed Rate, g/hr" | 200 | 200 | 200 | 200 | 200 | 200 |
| "$SiO_2$ (Weight Loss), mg" | 37.3 | 57.8 | 136.5 | 177.9 | 169.1 | 138.1 |
| "$SiO_2$ (Collected), mg" Based On Weight Loss | 61.8 | 60.2 | 123.6 | 159.4 | 153.9 | 107.2 |
| "$SiO_2$ flux, mg/hr/m$^2$" | 265 | 216 | 255 | 166 | 158 | 129 |
| "$SiO_2/H_2O$, wppm" | 7.4 | 6.0 | 7.1 | 4.6 | 4.4 | 3.6 |

These data show that the silica flux gradually decreases from an initial value of about 265 mg/hr/m$^2$ to 129 mg/hr/m$^2$ after the 31 days. The corresponding silica loading in the steam decreased from 7.4 to 3.6 $SiO_2/H_2O$ wppm; reasonable values relative to the potential maximum equilibrium $SiO_2/H_2O$ of 24 wppm. The available surface silica was thus effectively removed from the specimens of refractory over the 31 day period.

EXAMPLE 2

Activity data were obtained in a fixed bed reactor operated at 1800° F. and about 390 psia by passing a gas feed mixture containing $CH_4$, $H_2$, CO and $H_2O$ in molar ratio of 1:1:1:2 over a nickel-on-alumina catalyst. In conducting a run with the catalyst, a specimen of 17 AC alumina refractory was placed in the reactor above the catalyst so that the feed passed over it prior to contact with the catalyst. The 17AC alumina refractory contained small quantities of silica (0.49 wt. %), phosphorus (0.037 wt. %) and sulfur (0.058 wt.%), all known poisons for the nickel-on-alumina catalyst. The activity of the fresh nickel-on-alumina catalyst, or catalyst as initially employed prior to any poisoning, was found to be 15.6$^1$/sec.

The same portion of the 17AC refractory was used in three cycles of operation, and fresh catalyst charges were used in each cycle. Table 2 records the results of this run.

TABLE 2

| RUN | TIME ON STREAM, HRS. | REFRACTORY CUMULATIVE TIME ON STREAM, HRS. | ACTIVITY, 1/sec. |
|---|---|---|---|
| Base Catalyst | — | | 15.6 |
| 1st Cycle[1] | 68 | 68 | 5.6 |
| 2nd Cycle[2] | 70 | 138 | 10.6 |
| 3rd Cycle[3] | 72 | 210 | 15.4 |

Notes:
[1] Fresh refractory plus fresh catalyst.
[2] First cycle refractory plus fresh catalyst.
[3] Second cycle refractory plus fresh catalyst.

At the end of the first cycle, i.e., after 68 hours of operation, the activity of the catalyst had dropped from 15.6 1/sec. to 5.6 1/sec. end of the second cycle, i.e., after an additional 72 hours, or 138 hours of operation with the refractory, the fresh catalyst showed less of an activity decrease, reaching 10.6 1/sec. At the end of the third cycle of operation, i.e. after 210 hours of operation, the activity of the catalyst was 15.4 1/sec; a value approximating the activity of the fresh catalyst. In other words, by the end of the third cycle little or none of the poisons were being leached from the refractory. It is apparent that various modifications and changes can be made without departing the spirit and scope of the invention.

Having described the invention, what is claimed is:

1. In a process for the production of hydrogen and carbon monoxide from low molecular weight hydrocarbons within a reaction zone lined with a silica-containing refractory, the improvement comprising contacting, in an initial pretreat step prior to changing catalyst to the reaction zone, the silica-containing refractory liner of the reaction zone with steam sufficient to react with the silica component thereof, produce migration of the silica out of the refractory liner, convert the silica to gaseous silicic acid, and remove the gaseous silicic acid from the reaction zone, and thereafter adding metal-on alumina catalyst to the reaction zone, and contacting, within the pretreated reaction zone, a low molecular weight hydrocarbon feed comprising methane, an oxygen feed, and a steam feed with a fluidized bed of the catalytic metal-on-alumina catalyst at high temperature in a net reducing atmosphere to produce said hydrogen and carbon monoxide.

2. The process of claim 1 wherein the refractory liner is contacted with steam at temperatures ranging from about 1500° F. to about 1900° F. for a period ranging from about 1 day to about 60 days.

3. The process of claim 2 wherein the period of treatment ranges from about 5 days to about 15 days.

4. The process of claim 2 wherein the steam is introduced into the reaction zone at steam partial pressures ranging from about 30 psia to about 400 psia.

5. The process of claim 4 wherein the steam partial pressure ranges from about 60 psia to about 200 psia.

6. The process of claim 1 wherein in the initial preheat step a mixture of steam and a reducing gas is employed to convert the silica impurity of the refractory liner to gaseous silicic acid.

7. The process of claim 6 wherein the mixture used to convert the silica to silicic acid is steam and hydrogen.

8. The process of claim 7 wherein the treat gas mixture contains a molar ratio of steam:hydrogen ranging from about 10:1 to about 0.1: 1.

9. The process of claim 8 wherein the treat gas mixture contains a molar ratio of steam:hydrogen ranging from about 4:1 to about 0.25: 1.

10. The process of claim 1 wherein the refractory liner contains besides silica, either phosphorus or sulfur, or both phosphorus and sulfur as impurities, and in the initial preheat step a mixture of steam and a reducing gas is employed to convert the silica impurity, and other of the impurities in the refractory liner to compounds which are removed from the reaction zone.

11. The process of claim 10 wherein the treat gas comprises a mixture of steam and hydrogen, and the mixture contains a molar ratio of steam:hydrogen ranging from about 10:1 to about 0.1:1.

12. The process of claim 11 wherein the gaseous mixture contains a molar ratio of steam:hydrogen ranging from about 4:1 to about 0.25: 1.

* * * * *